(12) United States Patent
Germain

(10) Patent No.: US 7,444,823 B2
(45) Date of Patent: Nov. 4, 2008

(54) METHOD AND DEVICE FOR COOLING A STREAM OF GASEOUS LIQUID AND A METHOD OF COOLING ARTICLES

(75) Inventor: Jean-Pierre Germain, Montigny le Bretonneux (FR)

(73) Assignee: L'Air Liquide, Societe Anonyme A Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 190 days.

(21) Appl. No.: 10/501,270

(22) PCT Filed: Jan. 7, 2003

(86) PCT No.: PCT/FR03/00021

§ 371 (c)(1),
(2), (4) Date: Jul. 9, 2004

(87) PCT Pub. No.: WO03/058140

PCT Pub. Date: Jul. 17, 2003

(65) Prior Publication Data

US 2005/0120724 A1    Jun. 9, 2005

(30) Foreign Application Priority Data

Jan. 9, 2002    (FR) .................................. 02 00196

(51) Int. Cl.
*F25D 13/06*    (2006.01)
(52) U.S. Cl. ............................... 62/63; 62/345; 62/347; 99/517; 426/524

(58) Field of Classification Search .................. 62/63, 62/68, 69, 70, 348, 345, 347, 50.2, 404–426, 62/274, 380, 50.1; 99/468, 519; 426/471, 426/519, 524

See application file for complete search history.

(56) References Cited

U.S. PATENT DOCUMENTS

| 3,385,073 | A |   | 5/1968  | Snelling |
|---|---|---|---|---|
| 4,307,580 | A | * | 12/1981 | Shaw ........................... 62/375 |
| 4,777,733 | A | * | 10/1988 | Usuiwa et al. ................ 34/429 |
| 4,914,927 | A | * | 4/1990  | Miller et al. ................... 62/381 |
| 4,918,928 | A | * | 4/1990  | Morioka et al. .............. 62/51.1 |
| 5,036,673 | A | * | 8/1991  | Miller et al. .................... 62/63 |
| 5,073,182 | A | * | 12/1991 | Virey et al. ..................... 65/84 |
| 5,261,243 | A |   | 11/1993 | Dunsmore |
| 5,403,399 | A | * | 4/1995  | Kurihara et al. ........ 118/723 DC |
| 5,649,427 | A | * | 7/1997  | Sawada et al. ............... 62/50.2 |
| 5,836,166 | A | * | 11/1998 | Wardle ........................... 62/63 |
| 5,948,456 | A | * | 9/1999  | Jones et al. .................. 426/100 |

(Continued)

FOREIGN PATENT DOCUMENTS

FR    1 349 403    1/1964

(Continued)

OTHER PUBLICATIONS

International Search Report for PCT/FR03/00021.

*Primary Examiner*—Mohammad M Ali
(74) *Attorney, Agent, or Firm*—Christopher J. Cronin

(57) ABSTRACT

A method and a device for cooling various articles. A gas stream is cooled with liquid nitrogen and the cooled stream is then applied to articles in order to cool them.

7 Claims, 1 Drawing Sheet

U.S. PATENT DOCUMENTS

| | | | |
|---|---|---|---|
| 6,044,648 A * | 4/2000 | Rode | 62/62 |
| 6,070,416 A | 6/2000 | Germain et al. | |
| 6,268,443 B1 * | 7/2001 | Uwai et al. | 526/124.2 |
| 6,367,715 B1 * | 4/2002 | Rieth | 239/290 |
| 6,389,828 B1 * | 5/2002 | Thomas | 62/186 |

FOREIGN PATENT DOCUMENTS

| | | |
|---|---|---|
| JP | 9-273864 A * | 10/1997 |

* cited by examiner

U.S. Patent
Nov. 4, 2008
US 7,444,823 B2
Single figure
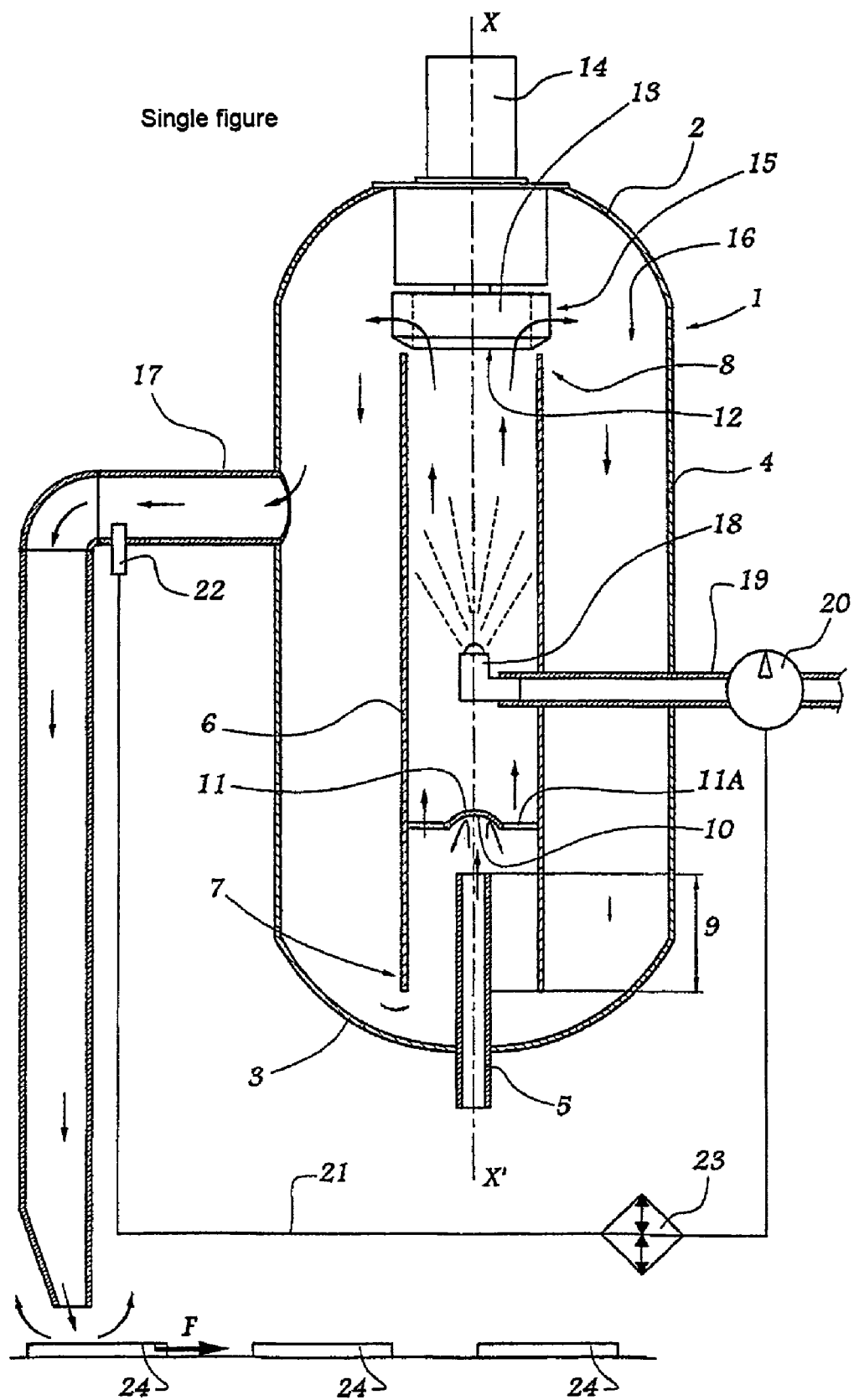

METHOD AND DEVICE FOR COOLING A STREAM OF GASEOUS LIQUID AND A METHOD OF COOLING ARTICLES

BACKGROUND

The present invention relates to a method and a device for cooling a stream of gaseous fluid such as air. It also relates to a method for cooling articles using the above method for cooling a stream of gaseous fluid.

A stream of gaseous fluid is conventionally cooled by contacting this stream with a colder cooling surface. This cooling surface is defined by an element that must itself be cooled. For example, a cooling fluid other than the gaseous fluid to be cooled can be used for the purpose, in the case of cooling by means of a heat exchanger. In consequence, this cooling mode has the drawback of presenting a certain inertia. In particular, during startup, it cannot be used to go, in a relatively short time, from a situation in which the flow of gaseous fluid is not cooled, to a stabilized and operational operating regime in which the stream of gaseous fluid is cooled to the desired temperature.

It has also been described in the art how to cool a stream of gaseous fluid by the injection of a cooling fluid into the stream (reference can be made to documents FR-1 349 403, U.S. Pat. No. 3,385,073 and U.S. Pat. No. 5,261,243).

It is therefore at least one object of the invention, which aims to improve the cooling efficiencies obtained by the techniques of the prior art, to increase the rate at which the temperature of a stream of cooled gaseous fluid can be modified.

SUMMARY

For this purpose, the subject of the invention is a method for cooling a stream of gaseous fluid, comprising steps wherein:
 a) said stream is confined;
 b) during step a), liquid nitrogen is sprayed into the stream to cool the gaseous fluid, and then
 c) the cooled gaseous fluid is recovered, and is characterized in that before step b), it comprises a step wherein:
 d) the gaseous fluid is slowed down by increasing the cross section of the stream.

BRIEF DESCRIPTION OF THE DRAWING

For a further understanding of the nature and objects for the present invention, reference should be made to the following detailed description, taken in conjunction with the accompanying drawing, in which like elements are given the same or analogous reference numbers and wherein:

FIG. 1 illustrates one embodiment according to the invention of a device to cool chocolate articles.

DESCRIPTION OF PREFERRED EMBODIMENTS

The subject of the invention is a method for cooling a stream of gaseous fluid, comprising steps wherein:
 a) said stream is confined;
 b) during step a), liquid nitrogen is sprayed into the stream to cool the gaseous fluid, and then
 c) the cooled gaseous fluid is recovered, and is characterized in that before step b), it comprises a step wherein:
 d) the gaseous fluid is slowed down by increasing the cross section of the stream.

According to other advantageous features of this cooling method:
 step c) is carried out only after the liquid nitrogen has completely vaporized in the stream;
 in step d), the stream is directed toward an impact surface;
 after step b) and before step c), it comprises a step wherein;
 e) the stream is stirred.
 in step e), the stream is stirred by sucking in the gaseous fluid by means of a turbomachine;
 in step e), the stream is stirred by deflection;
 by adjusting the flow rate of liquid nitrogen sprayed in step b), the temperature of the gaseous fluid recovered in step c) is regulated about a preset temperature.

A further subject of the invention is a method for cooling articles, characterized in that it includes the cooling method described above, and at least one step in which the gaseous fluid recovered in step c) is sent onto the articles.

According to other advantageous features of this method for cooling articles, the gaseous fluid is air.

A further subject of the invention is a device for cooling a stream of gaseous fluid, comprising a mixing pipe through which the stream should pass, and means for spraying liquid nitrogen into this mixing pipe, characterized in that it comprises a pipe for injecting the gaseous fluid into the mixing pipe, this injection pipe being directed toward at least one impact surface located inside the mixing pipe, and in that at least on a section containing the impact surface and said spraying means, the mixing pipe has a larger cross section than the cross section of the injection pipe.

According to other advantageous features of this cooling device:
 the injection pipe is engaged in the mixing pipe via an upstream end of this mixing pipe, said impact surface being turned substantially toward this upstream end;
 the impact surface is concave;
 the device comprises means for stirring the gaseous fluid, these stirring means being placed downstream of the spraying means;
 the device comprises a chamber into which a downstream end of the mixing pipe discharges, the chamber and the mixing pipe together delimiting a calming passage for the gaseous fluid, the chamber possessing an exit for the gaseous fluid, located at the level of said calming passage;
 the stirring means are placed upstream of said calming passage;
 the upstream end of the mixing pipe is open and located in the chamber;
 the device comprises suction means placed downstream of the spraying means and upstream of the exit, and able to drive the gaseous fluid in the flow direction;
 a turbomachine is common to the stirring means and the suction means;
 the turbomachine is a centrifugal fan which is arranged at the downstream end of the mixing pipe, to suck in the gaseous fluid flowing in this mixing pipe;
 the device comprises a regulation loop for regulating the outlet temperature of the gaseous fluid leaving the cooling device about a preset temperature, this regulation loop comprising:
 means for measuring said outlet temperature;
 means for adjusting the flow rate of nitrogen supplied to the spraying means, and
 a regulator able to actuate said adjusting means, from a signal transmitted by the measuring means.

The invention will be clearly understood from a reading of the description that follows, given only as an example and by reference to the single appended figure, which is a schematic axial cross sectional view of a device according to the invention, for cooling an air stream for cooling chocolate articles.

For the sake of clarity, the proportions of the cooling device are not respected in this single FIGURE.

The cooling device shown is essentially overall symmetrical about a vertical axis X-X'. It comprises a substantially sealed chamber 1, which comprises two convex end walls, one upper 2 and the other lower 3, opposite each other and connected together by a side wall or cylindrical shell 4.

A vertical pipe 5 for injecting air to be cooled into the cooling device passes through the lower wall 3 and discharges into a mixing pipe 6, mounted vertically inside the chamber 1. This mixing pipe 6 is substantially rectilinear, with a circular cross section, and it has an upstream end 7, open and directed toward the lower wall 3, and a downstream end 8, open and directed toward the upper wall 2.

The injection pipe 5, the mixing pipe 6 and the chamber 1 are substantially coaxial.

A downstream end portion 9 of the injection pipe 5, which has a substantially smaller cross section than that of the mixing pipe 6, is introduced into the upstream end 7 of this pipe 6 and is directed toward an impact surface 10.

This impact surface 10, concave downward and located inside the mixing pipe 6, is supported by an anti-splash barrier 11, fixed at the center of the mixing pipe 6 by means of several radial arms 11A.

The downstream end 8 of the mixing pipe 6 discharges directly into the axial suction 12 of a centrifugal fan 13 mounted in the upper wall 2 and provided with a drive motor 14. The circumferential discharge 15 of the centrifugal fan 13 extends opposite the side wall 4, in the chamber 1, and it is located upstream of an annular and lateral calming passage 16, which the mixing pipe 6 and the side wall 4 delimit together.

The chamber 1 is provided with an exit formed by a manifold 17, the mouth of which extends into the calming passage 16.

A nozzle 18 for spraying liquid nitrogen is mounted inside the mixing pipe 6, downstream of the anti-splash barrier 11, at the end of a liquid nitrogen intake tube 19. It is turned toward the downstream end 8 of the mixing pipe 6, that is in the planned flow direction of the air to be cooled. The intake tube 19 is provided with a pump 20.

A loop 21 for regulating the outlet air temperature of the cooling device comprises a sensor 22 for measuring the temperature in the exit manifold 17, and a regulator 23 connected to this sensor 22 and to the pump 20.

In the single figure, the air flow inside the cooling device in operation is symbolized by arrows without reference numerals. The air to be cooled is compressed to a distribution pressure before being sent to the chamber 1 via the injection pipe 5. It directly enters the mixing pipe 6, in the form of a jet which is broken on the impact surface 10. It is then attracted by the negative pressure created at the inlet of the centrifugal fan 13 and travels toward the downstream end 8 of the mixing pipe 6. In doing so, it flows around the nozzle 18, which sprays liquid nitrogen in the form of droplets. These liquid nitrogen droplets penetrate even better into the air stream since the air flows more slowly, this stream having a larger cross section after the anti-splash barrier 11. The sprayed nitrogen droplets are vaporized in the air, which is thereby cooled.

The air sucked in axially by the centrifugal fan 13 is discharged radially against the side wall 4, at the upper inlet of the annular passage 16. Thus, in addition to sucking in the air present in the mixing pipe 6, this centrifugal fan 13 stirs the air vigorously. This stirring, which is even more effective since the air is deflected in the fan 13 and against the side wall 4, homogenizes the stream and promotes the vaporization of the last droplets of nitrogen.

After passing the centrifugal fan 13, the cooled air enters the passage 16, where the flow is calmed. After having traveled a portion of the length of this calming passage 16, most of the air sucked in by the centrifugal fan 13 escapes through the exit manifold 17, while a small portion of this air travels toward the upstream end 7 of the mixing pipe 6, before recirculating in said pipe.

All the nitrogen droplets are completely vaporized and the air no longer contains any droplets when it enters the exit manifold 17. In many applications, this is an advantage. In particular, in the example shown, this serves to cool articles 24 made of chocolate to be solidified, by sending the air recovered in the exit manifold 17 directly on top of the chocolate, it being understood that an unacceptable alteration of the final appearance of the chocolate would result from any contact of this chocolate with liquid nitrogen during solidification.

The vaporization of nitrogen droplets in the air to be cooled does not qualitatively change the composition of this air. Thus the air can be discharged into the atmosphere, without any concern about pollution, for example by being blown onto the articles 24, so as in turn to cool these articles 24 by traveling along the arrow F.

Water, present in the form of vapor in the air intake, can form condensates during cooling. The vertical orientation of the chamber 1 and the mixing pipe 6, and the absence of any obstruction of the upstream end 7 of this pipe, facilitate the removal of these condensates by a purge (not shown) fitted to the lower wall 3.

The cooled air outlet temperature is regulated by means of the regulation loop 21, about a preset temperature, set between −196° C., which is the boiling point of nitrogen under atmospheric pressure, and the ambient temperature at which the air to be cooled is introduced via the injection pipe 5. For this purpose, the regulator 23 adjusts the flow rate of sprayed liquid nitrogen by controlling the speed of rotation of the pump 20, from the temperature measurement performed by the sensor 22.

The invention is not limited to the embodiment described above. In particular, the liquid nitrogen can be sprayed otherwise than by means of the nozzle 18, for example by means of spray bars.

Moreover, although it stirs the air very efficiently, and although it simultaneously performs another function, that is the suction of the mixture present in the mixing pipe 6, the centrifugal fan 13 can be replaced with other stirring means, such as a set of deflectors arranged in a zigzag pattern. Although its use implies a compact, simple and robust assembly, it can also be replaced by another turbomachine, such as an axial fan mounted inside the mixing pipe 6.

Moreover, the invention can be put into practice by means of a cooling device having an overall configuration that is substantially different from the one described above, even though the configuration described offers undeniable advantages in terms of compactness and efficiency.

Furthermore, the invention can be put into practice to cool a gaseous fluid other than air.

Among the advantages of the invention, it should be noted that it makes it possible to reach particularly low temperatures, lower than −150° C. and even around −196° C. It will be understood that many additional changes in the details, materials Steps and arrangements of parts, which have been herein described in order to Explain the nature of the invention, may be made by those skilled in the art within The principle and scope of the invention as expressed in the appended claims. Thus, the present invention is not intended to be limited to the specific Embodiments in the examples given above.

What is claimed is:

1. A method for cooling objects comprising:
   a) cooling a stream of gaseous fluid, wherein said cooling further comprises:
      1) confining said stream;
      2) slowing the flow rate of said fluid by increasing the cross section of said stream;
      3) spraying liquid nitrogen into said stream to cool said fluid; and
      4) diverting at least a portion of the cooled fluid and allowing said diverted portion to exit said confinement; and
   b) applying said diverted portion of said fluid directly to said objects thereby cooling them.

2. The method of claim 1, wherein said objects comprise foodstuffs.

3. The method of claim 2, wherein said foodstuffs comprise chocolate.

4. The method of claim 1, further comprising diverting said portion of said fluid only after said liquid nitrogen has completely vaporized in said stream.

5. The method of claim 1, wherein said gaseous fluid comprises air.

6. The method of claim 1, wherein the temperature of said diverted fluid is about −150° C. to about −196° C.

7. An apparatus which may be used for cooling a stream of gaseous fluid comprising:
   a) a mixing pipe through which said stream passes;
   b) at least one impact surface located inside said mixing pipe;
   c) a means for spraying liquid nitrogen into said mixing pipe, and
   d) an injection pipe for injecting said fluid into said mixing pipe, wherein said mixing pipe has a cross-section larger than that of impact surface and said spraying means, and
   e) a regulation loop for regulating the outlet temperature of said gaseous fluid leaving said cooling device to a preset temperature, said regulation loop comprising:
      i) a means for measuring said outlet temperature;
      ii) a means for adjusting the flow rate of nitrogen supplied to said spraying means, and
      iii) an actuator, wherein said actuator receives a signal from said measuring means and actuates said adjusting means.

* * * * *